(12) United States Patent
Coulter et al.

(10) Patent No.: US 7,457,830 B1
(45) Date of Patent: Nov. 25, 2008

(54) METHOD AND SYSTEM OF REPLICATING DATA USING A RECOVERY DATA CHANGE LOG

(75) Inventors: Timothy R. Coulter, San Jose, CA (US); Scott D. Rose, Foster City, CA (US)

(73) Assignee: Symantec Operating Corporation, Cupertino, CA (US)

( * ) Notice: Subject to any disclaimer, the term of this patent is extended or adjusted under 35 U.S.C. 154(b) by 476 days.

(21) Appl. No.: 10/788,697

(22) Filed: Feb. 27, 2004

(51) Int. Cl.
*G06F 12/00* (2006.01)

(52) U.S. Cl. ...................... 707/202; 707/204
(58) Field of Classification Search ............ 707/1, 707/10, 100, 200–204; 711/114
See application file for complete search history.

(56) References Cited

U.S. PATENT DOCUMENTS

| | | | |
|---|---|---|---|
| 7,130,974 B2 * | 10/2006 | Iwamura et al. ......... 711/162 |
| 2003/0212789 A1 * | 11/2003 | Hamel et al. ........... 709/225 |
| 2004/0193658 A1 * | 9/2004 | Kawamura et al. ...... 707/202 |
| 2004/0260873 A1 * | 12/2004 | Watanabe ............. 711/114 |
| 2005/0081091 A1 * | 4/2005 | Bartfai et al. .......... 714/6 |
| 2006/0143238 A1 * | 6/2006 | Tamatsu ............... 707/200 |

* cited by examiner

*Primary Examiner*—Wilson Lee
(74) *Attorney, Agent, or Firm*—Campbell Stephenson LLP

(57) ABSTRACT

A method and system of replicating data using a recovery data change log. According to one embodiment a method is provided in which a copy of a data change log at a primary node is maintained at a data recovery node, the data change log being associated with a primary data volume of the primary node, a failure of the primary data volume is detected, and a secondary data volume of a secondary node is updated using the copy of the data change log in response to the detection.

18 Claims, 8 Drawing Sheets

METHOD AND SYSTEM OF REPLICATING DATA USING A RECOVERY DATA CHANGE LOG

BACKGROUND OF THE INVENTION

1. Field of the Invention

The present invention relates to data storage and retrieval generally and more particularly to a method and system of replicating data using a recovery data change log.

2. Description of the Related Art

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication is one technique utilized to minimize data loss and improve the availability of data in which a replicated copy of data is distributed and stored at one or more remote sites or nodes. In the event of a site migration, failure of one or more physical disks storing data or of a node or host data processing system associated with such a disk, the remote replicated data copy may be utilized, ensuring data integrity and availability. Replication is frequently coupled with other high-availability techniques such as clustering to provide an extremely robust data storage solution. Metrics typically used to assess or design a particular replication system include recovery point or recovery point objective (RPO) and recovery time or recovery time objective (RTO) performance metrics as well as a total cost of ownership (TCO) metric.

The RPO metric is used to indicate the point (e.g., in time) to which data (e.g., application data, system state, and the like) must be recovered by a replication system. In other words, RPO may be used to indicate how much data loss can be tolerated by applications associated with the replication system. The RTO metric is used to indicate the time within which systems, applications, and/or functions associated with the replication system must be recovered. Optimally, a replication system would provide for instantaneous and complete recovery of data from one or more remote sites at a great distance from the data-generating primary node. The high costs and application write operation latency associated with the high-speed link(s) required by such replication systems have discouraged their implementation however in all but a small number of application environments.

Replication systems in which alternatively high-frequency data replication is performed over short, high-speed links or low-frequency data replication is performed over longer, low-speed links alone similarly suffer from a number of drawbacks (e.g., a poor RPO metric, high write operation/application latency, high cost, replication and/or recovery failure where an event negatively impacts a primary node and one or more nodes including replicated data due to geographic proximity). Consequently a number of replication systems have been implemented in which such short-distance, high-speed/frequency replication (e.g., real-time or synchronous replication) is coupled (e.g., cascaded) with long-distance, low-speed/frequency replication.

In a cascaded replication system, complete copies of all the data generated and/or stored at the primary node are maintained at both an intermediary node (e.g., via short-distance, high-speed/frequency replication between the primary and intermediary nodes) and a secondary node (e.g., via long-distance, low-speed/frequency replication between the intermediary and secondary nodes). The costs of physical storage media, maintenance, infrastructure, and support required to store data at the intermediary node in such cascaded replication systems increase with the amount of data generated and/or stored at the primary node. A significant drawback associated with such cascaded replication systems therefore is that their cost may exceed that of the high-speed, long-distance links required by traditional replication where the amount of data is large (e.g., terabytes), making them unworkable.

SUMMARY OF THE INVENTION

Disclosed is a method and system of replicating data using a recovery data change log. According to one embodiment of the present invention, a copy of a data change log is maintained at a data recovery node, the data change log being associated with a primary data volume of a primary node, a failure of the primary data volume is detected, and a secondary data volume of a secondary node is updated using the copy of the data change log in response to the detection.

Embodiments of the present invention may be used to quickly and reliably replicate data to one or more secondary nodes while reducing replication costs and write operation latency. By maintaining a subset of the data at a primary node in the form of a data change log or "journal" at a recovery node rather than the entire primary node data set, alternative, less-expensive replication techniques (e.g., asynchronous, periodic) may be used to replicate data between the primary node and a secondary node used for failover with fewer data storage devices required at the recovery node as compared with the intermediary node of a typical cascaded replication system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
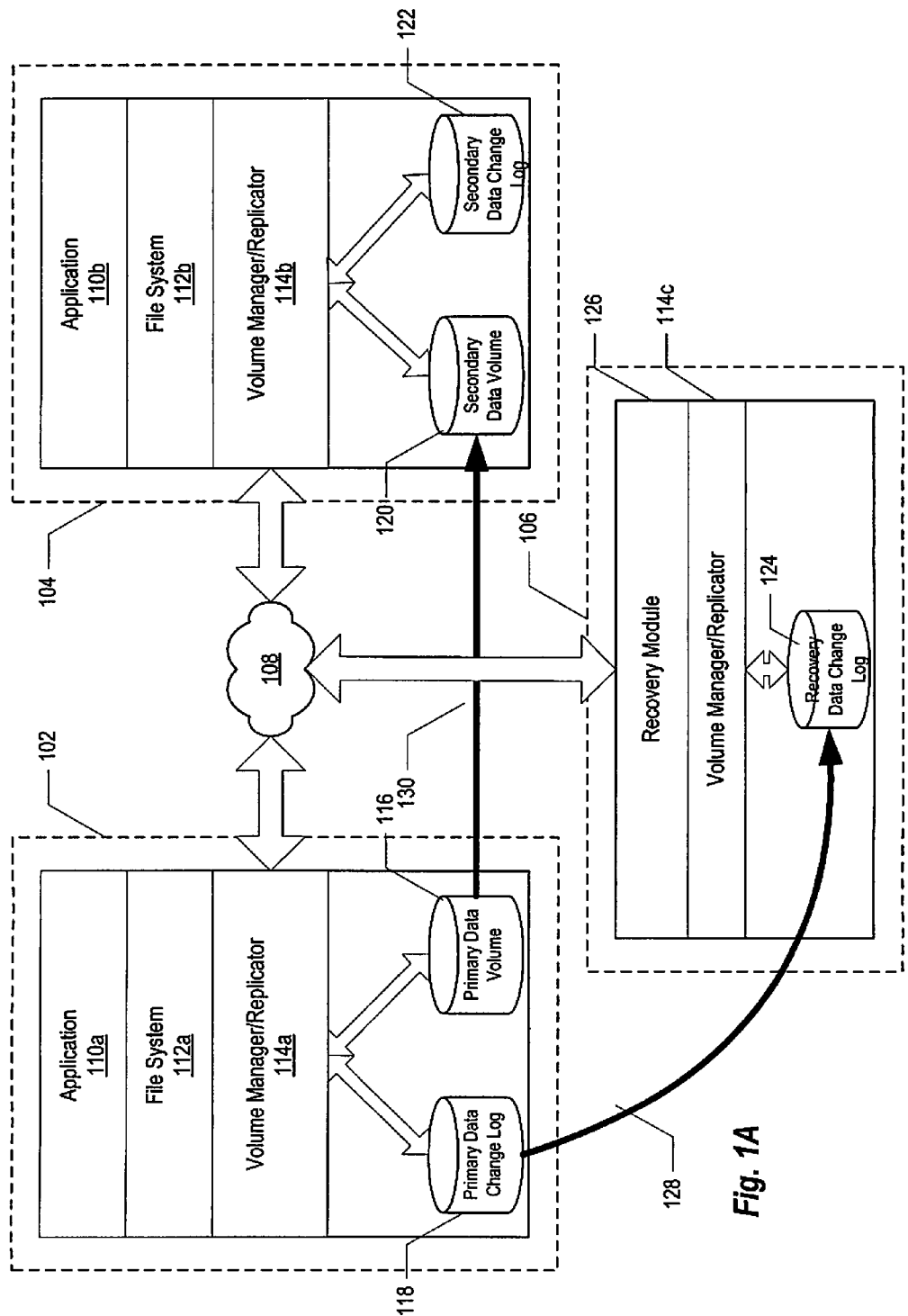
FIG. 1A illustrates a data replication system operating in a replication mode according to an embodiment of the present invention.

FIG. 1A illustrates a data replication system operating in a replication mode according to an embodiment of the present invention. The illustrated data replication system includes a primary node (e.g., network element, data processing system, data center, enterprise, or the like) 102, a secondary node 104, and a recovery node 106 communicatively coupled with one another using a communications network 108 including one or more communications links. Within the context of the present description each "node" indicates a functional entity or physical location. Accordingly, primary node 102, secondary node 104, and recovery node 106 are not limited to a single data processing system or device but may encompass any number of operationally coupled systems or devices.

Communications network 108 may include one or more local area networks, metropolitan area networks, wide area networks, storage area networks, or a combination thereof. According to one embodiment, recovery node 106 is geographically close to primary node 102 (e.g., ~10s-100s of miles) while secondary node 104 is geographically far from primary node 102 (e.g. 100s-1000s of miles). In the described embodiment, recovery node 106 is located at an intermediate geographic point between primary node 102 and secondary node 104, however no particular relationship of physical proximity or location are necessary to implement embodiments of the present invention.

Primary node 102 of the illustrated embodiment includes an application 110a (e.g., a database management system), a file system 112a, a volume manager and/or volume replicator 114a, a primary data volume 116 and a primary data change log 118 (e.g., a storage replicator log or the like) associated with primary data volume 116. In the embodiment of FIG. 1A, secondary node 104 is depicted as including a corresponding application (110b), file system (112b), and volume manager and/or volume replicator (114b) as shown. Recovery node 106 of the illustrated embodiment includes a corresponding volume manager and/or volume replicator 114c. In alternative embodiments of the present invention, any of primary node 102, secondary node 104 and recovery node 108 may include distinct applications 110, file systems 112, and volume manager(s) and/or volume replicator(s) 114 and may include a greater or lesser number of such components.

In the embodiment of FIG. 1A, secondary node 104 serves as the target for data replication from primary node 102 and includes a secondary data volume 120 and a secondary data change log 122 as shown. Recovery node 106 of the illustrated embodiment includes a recovery data change log 124 and a recovery module 126. In alternative embodiments of the present invention, recovery module 126 may include any of a number of components resident within recovery node 106 or distributed among recovery node 106 and secondary node 104. Recovery data change log 124 acts, according to one embodiment, as a real-time copy of primary data change log 118 as further described herein. According to one embodiment, recovery data change log 124 is stored within a single storage device or logical unit number (LUN) within recovery node 106. As changes are made to primary data change log 118, duplicate changes are made to recovery data change log 124 as represented by line 128.

In the described replication mode, data to be written to primary data volume 116 (e.g., in the form of requested write operations) is replicated from primary data volume 116 to secondary data volume 120 across communications network 108 using volume replicator components of volume manager(s) and/or volume replicator(s) 114a and 114b, respectively as represented by line 130. In the illustrated embodiment of FIG. 1A, the described replication is performed asynchronously. In other embodiments of the present invention however, alternative replication techniques (e.g., periodic, synchronous, or the like) may be implemented.

During asynchronous replication, an application write operation completes as soon as the write or "update" is logged at the primary data change log 118. Consequently, transmission to and storage at secondary node(s) is concurrent with continued application execution at the primary node. Asynchronous replication typically reduces application response time and allows applications to continue execution during momentary network outages or overloads.

Concurrently with the described replication, data associated with each write operation being replicated is stored substantially simultaneously at primary data change log 118 and recovery data change log 124. In one embodiment, each write operation is "mirrored" to both primary data change log 118 and recovery data change log 124. In write operation "mirroring", separate write operations are generated (e.g., to each of primary data change log 118 and recovery data change log 124) for each write operation requested. Such mirrored write operations may be generated by various entities such as a file system or volume manager component.

In an alternative embodiment of the present invention, data associated with each write operation being replicated is synchronously replicated (e.g., using a volume replicator component of volume manager and/or volume replicator 114a) between primary data change log 118 and recovery data change log 124. In each embodiment however, the described operations are performed atomically such that recovery data change log 124 is maintained as a real-time copy of primary data change log 118.

Figure 1B:
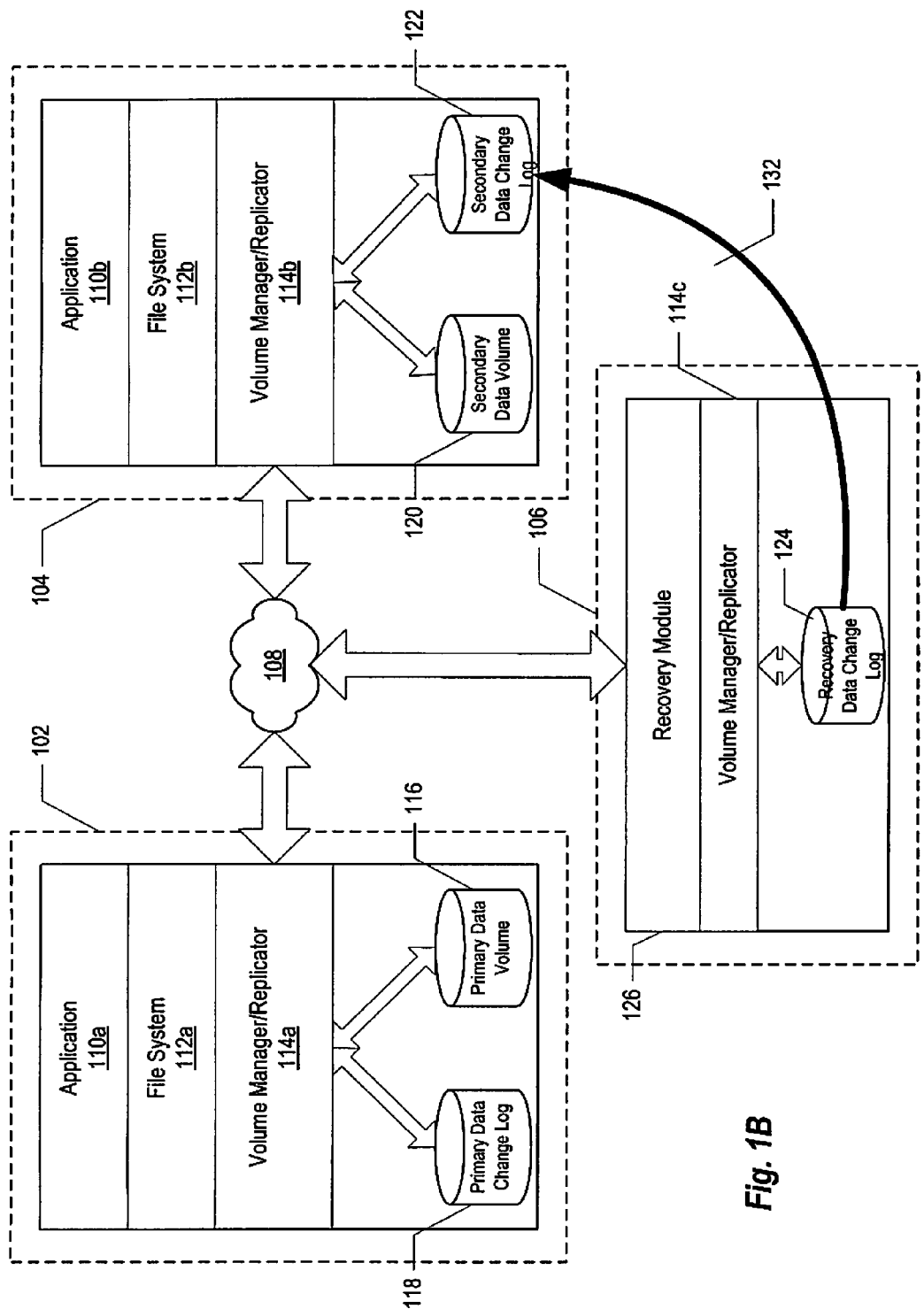
FIG. 1B illustrates a data replication system operating in a recovery mode according to a first embodiment of the present invention.

FIG. 1B illustrates a data replication system operating in a recovery mode according to a first embodiment of the present invention. The illustrated data replication system of FIG. 1B includes, as described with respect to FIG. 1A herein, a primary node 102, a secondary node 104, and a recovery node 106 communicatively coupled with one another using a communications network 108 including one or more communications links. In the described recovery mode of the illustrated embodiment of FIG. 1B however, no replication occurs between primary node 102 and secondary node 104 and no data associated with write operations at primary node 102 is mirrored, replicated, or otherwise transferred or copied between primary node 102 and recovery node 106. Rather, recovery data change log 124 is used in the illustrated embodiment to update secondary data volume 120. Within the presently described invention embodiments the term "update" includes the resynchronization of a node or data volume (e.g., the resynchronization of a secondary node or data volume with a corresponding primary node or data volume). In other embodiments of the present invention, the described "updating" can include any modification of a node or data volume (e.g., the selective application of write operations from a primary node or data volume to a secondary node or data volume).

In the illustrated embodiment of FIG. 1B, secondary data volume 120 is updated by copying one or more entries from recovery data change log 124 to secondary data change log 122 and updating secondary data volume 120 using secondary data change log 122. In one embodiment of the present invention, recovery data change log 124 includes a plurality of entries, each of which is associated with a requested write operation. The status of each write operation is determined such that, according to one embodiment, only those entries of recovery data change log 124 corresponding to incomplete write operations (e.g., those for which a final replication acknowledgment has not been received at the primary node) are copied to secondary data change log 122.

Once the appropriate entries of recovery data change log 124 have been identified, the identified entry(ies) are copied from the recovery data change log 124 to the secondary data change log 122 using volume replicator component(s) of volume manager(s) and/or volume replicator(s) 114c and 114b, respectively as represented by line 132. In alternative embodiments of the present invention however, any of a number of other data transport techniques or means are used to perform the described copying. In the illustrated embodiment, the described copying/replication is performed using recovery module 126. In alternative embodiments of the present invention, recovery module 126 may be implemented as data processing system software, hardware, firmware, and/or a combination thereof.

Figure 1C:
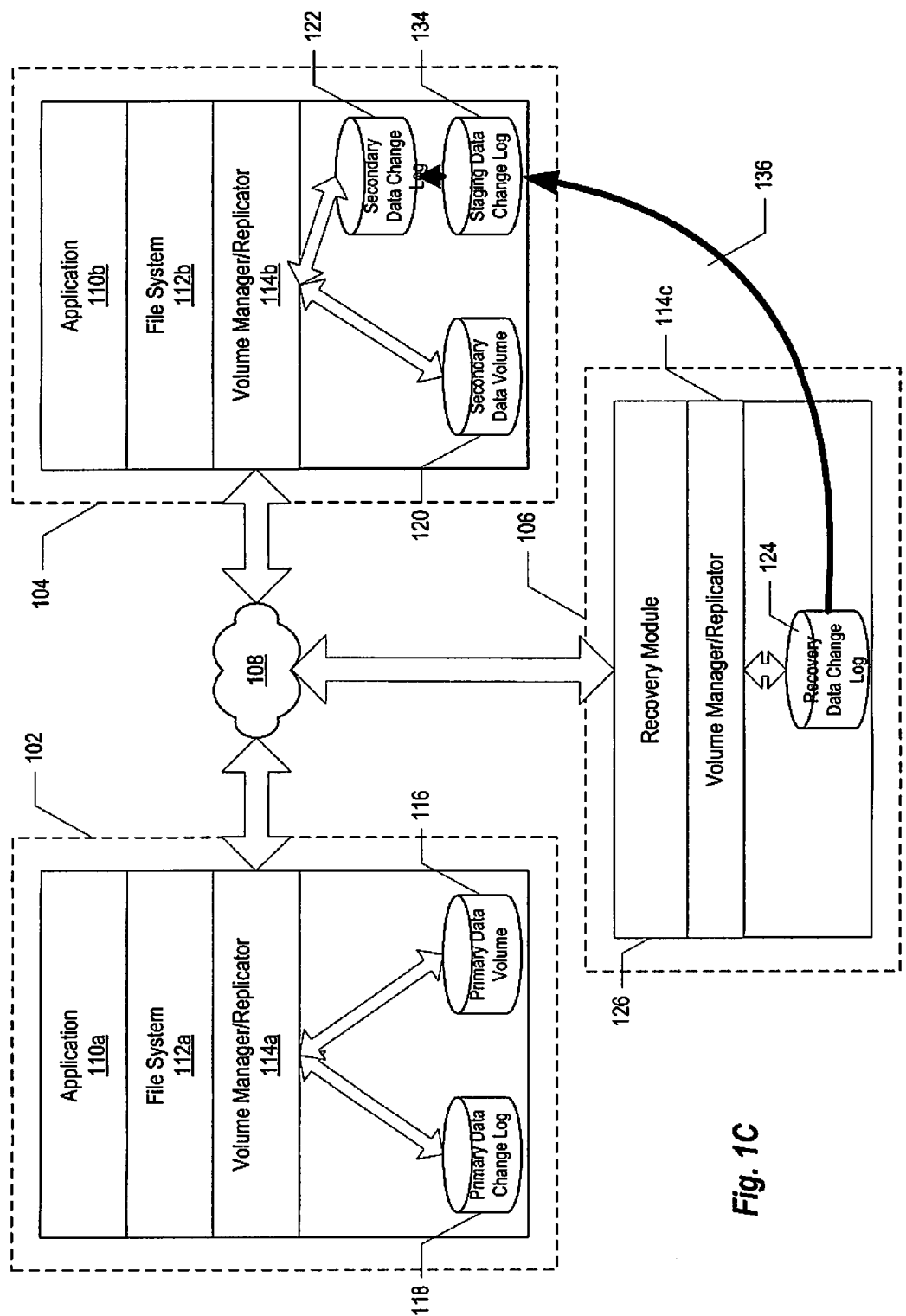
FIG. 1C illustrates a data replication system operating in a recovery mode according to a second embodiment of the present invention.

FIG. 1C illustrates a data replication system operating in a recovery mode according to a second embodiment of the present invention. The illustrated data replication system of FIG. 1C includes, as described with respect to FIGS. 1A and 1B herein, a primary node 102, a secondary node 104, and a recovery node 106 communicatively coupled with one another using a communications network 108 including one or more communications links. In the described recovery mode of the illustrated embodiment of FIG. 1C, no replication occurs between primary node 102 and secondary node 104 and no data associated with write operations at primary node 102 is mirrored, replicated, or otherwise transferred or copied between primary node 102 and recovery node 106. Rather, recovery data change log 124 is used in the illustrated embodiment to update secondary data volume 120.

In the illustrated embodiment of FIG. 1C, secondary data volume 120 is updated by copying one or more blocks of data, each block of data including one or more entries (e.g., entries corresponding to incomplete write operations at primary node 102), from recovery data change log 124 to a staging data change log 134 over communications network 108 (e.g., a wide area network) as represented by line 136. The copied block(s) are applied in write-ordered sets to secondary data change volume 122 which is used to update secondary data volume 120.

According to one embodiment of the present invention, recovery (including the updating of a secondary data volume using a real-time copy of a data change log at a primary node such as recovery data change log 124) is initiated manually by a user. In the described embodiment, a user interface may be used to generate a user prompt or notification following the detection of a failure of one or more components of primary node 102 and to receive such a manual update initiation indication. In an alternative embodiment, a user may configure recovery module 126 to automatically perform recovery operations in response to the detection of a failure at primary node 102.

Figure 2:
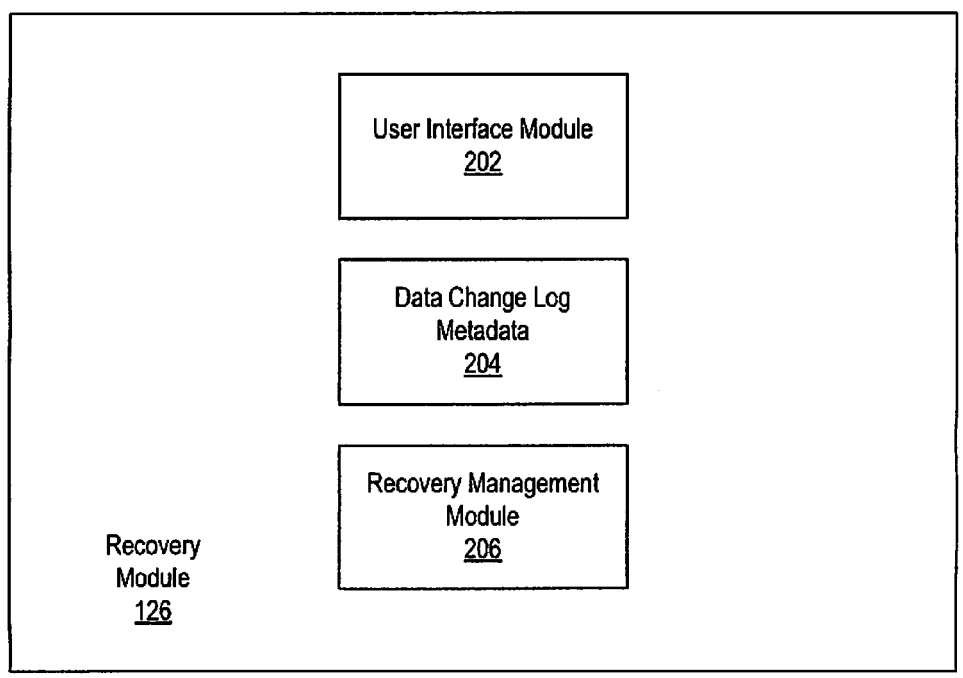
FIG. 2 illustrates a block diagram of a recovery module such as that illustrated in FIGS. 1A-1C according to an embodiment of the present invention.

FIG. 2 illustrates a block diagram of a recovery module such as that illustrated in FIGS. 1A-1C according to an embodiment of the present invention. The recovery module 126 depicted in FIG. 2 includes a user interface module 202, data change log metadata 204, and a failover management module 206. In the illustrated embodiment, user interface module is configured to receive configuration data from user used to configure components, attributes, and/or operations of recovery module 126, to generate and/or display one or more prompts or notification indicating the detection of a failure of one or more components of a primary node (e.g., primary data volume 116 of primary node 102 of FIGS. 1A-1C), and to receive manual update initiation indications.

Data change log metadata 204 of the illustrated embodiment includes data about data stored within a data change log such as recovery data change log 124 of FIGS. 1A-1C. For example, data change log metadata 204 includes (in one embodiment) data used to identify and/or locate a recovery data change log (e.g., data recovery change log 124 of FIGS. 1A-1C) and data relating to an associated secondary node (e.g., secondary node 104 of FIGS. 1A-1C) such as data used to identify and/or locate the secondary node's data volumes, disk group(s) or the like, data relating to the state of data replication between a primary node and the secondary node, interfaces supported by the secondary node, or the like.

Recovery management module 206 of the illustrated embodiment of FIG. 2 is configured to perform various functions or operations during data recovery. Such functions and/or operations may include but are not limited to the detection of a primary node and/or primary data volume failure (or the receipt of a notification of such a failure), the notification of such a failure to user interface module 202, the receipt of manual update initiation indications from user interface module 202, the identification of one or more recovery data change log entries corresponding to incomplete write operations on a primary data volume (e.g., primary data volume 116 of FIGS. 1A-1C), and the transfer or copying of such identified entries to a secondary node (e.g., secondary node 104 of FIGS. 1A-1C).

Figure 3:
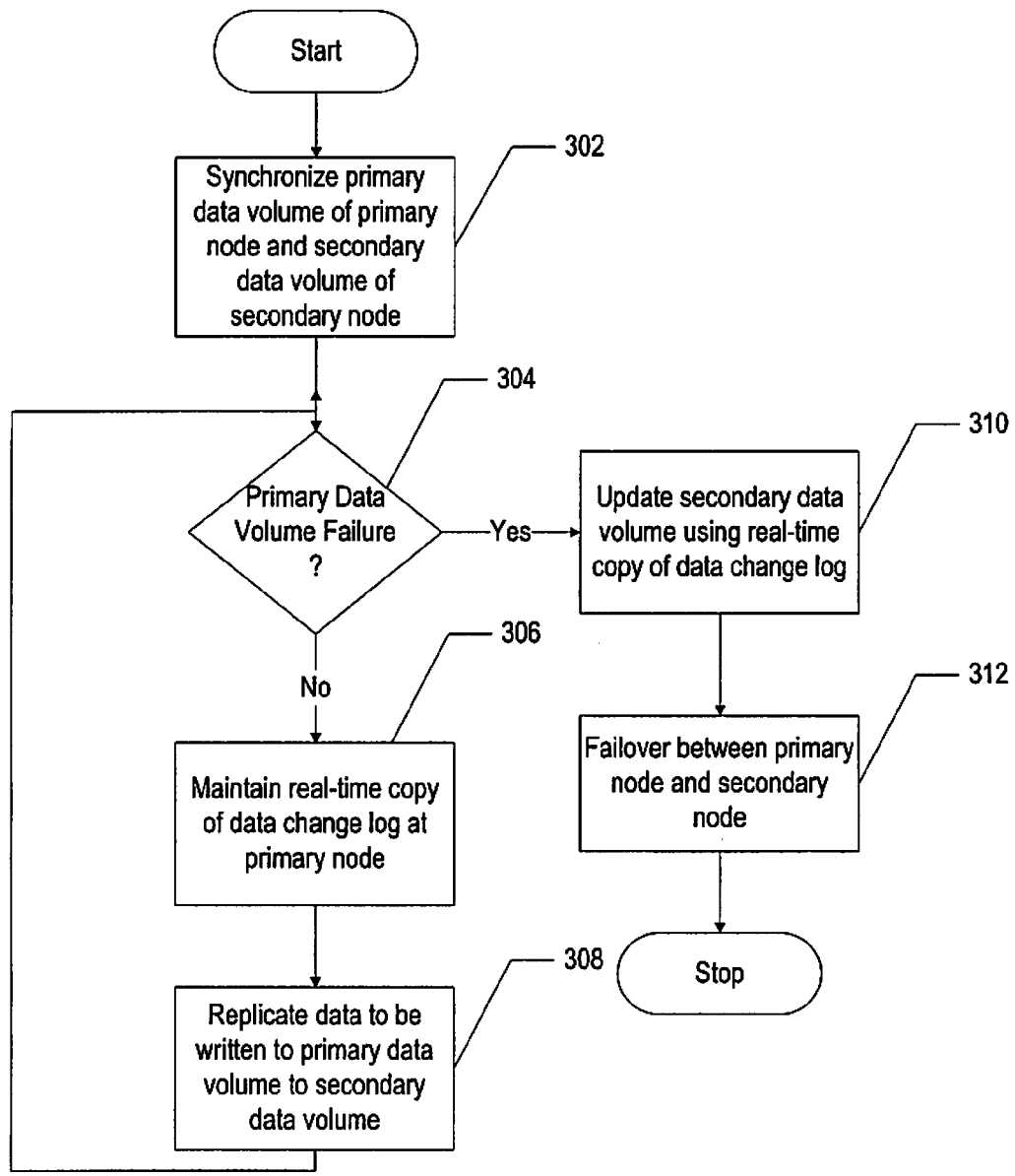
FIG. 3 illustrates a process flow diagram of a replication and recovery process according to an embodiment of the present invention.

FIG. 3 illustrates a process flow diagram of a replication and recovery process according to an embodiment of the present invention. In the illustrated process embodiment, a primary data volume of a primary node and a secondary data volume of a secondary node are initially synchronized (process block 302). Such initial synchronization may be implemented according to various embodiments of the present invention using data transfer from one node data processing system to another across a network, tape or other persistent backup and restore capabilities, or one or more snapshots or portions thereof. Following the initial synchronization of the described nodes and associated data volumes a determination is made whether or not a primary data volume failure has occurred (process block 304).

While elements of the depicted process embodiments have been illustrated herein as occurring sequentially and in a specific order, such elements or operations may occur partially or completely in parallel with one another and in any order in alternative embodiments of the present invention unless a specific order is explicitly recited or functionally necessary. Accordingly, in one embodiment of the present invention, a real-time copy of a data change log associated with the primary data volume is maintained (process block 306) and data to be written to the primary data volume is replicated to the secondary data volume (process block 308) concurrently until a determination is made that a failure of the primary data volume has occurred.

In the illustrated process embodiment of FIG. 3, the real-time data change log copy is maintained by atomically storing data associated with each write operation being replicated at the primary data change log and real-time copy (e.g., by mirroring or synchronous replication). Following the detection of a primary data volume failure, the secondary data volume is updated using the real-time data change log copy (process block 310) and fails over as the primary (process block 312) as shown. According to one embodiment, the described failover operation includes the promotion of the secondary node and/or secondary data volume to primary node and/or primary data volume. The previous primary node and/or primary data volume which has failed may then be deprecated to "secondary" status once it becomes operational or may be resynchronized and used as a primary data volume again in alternative embodiments of the present invention.

Figure 4:
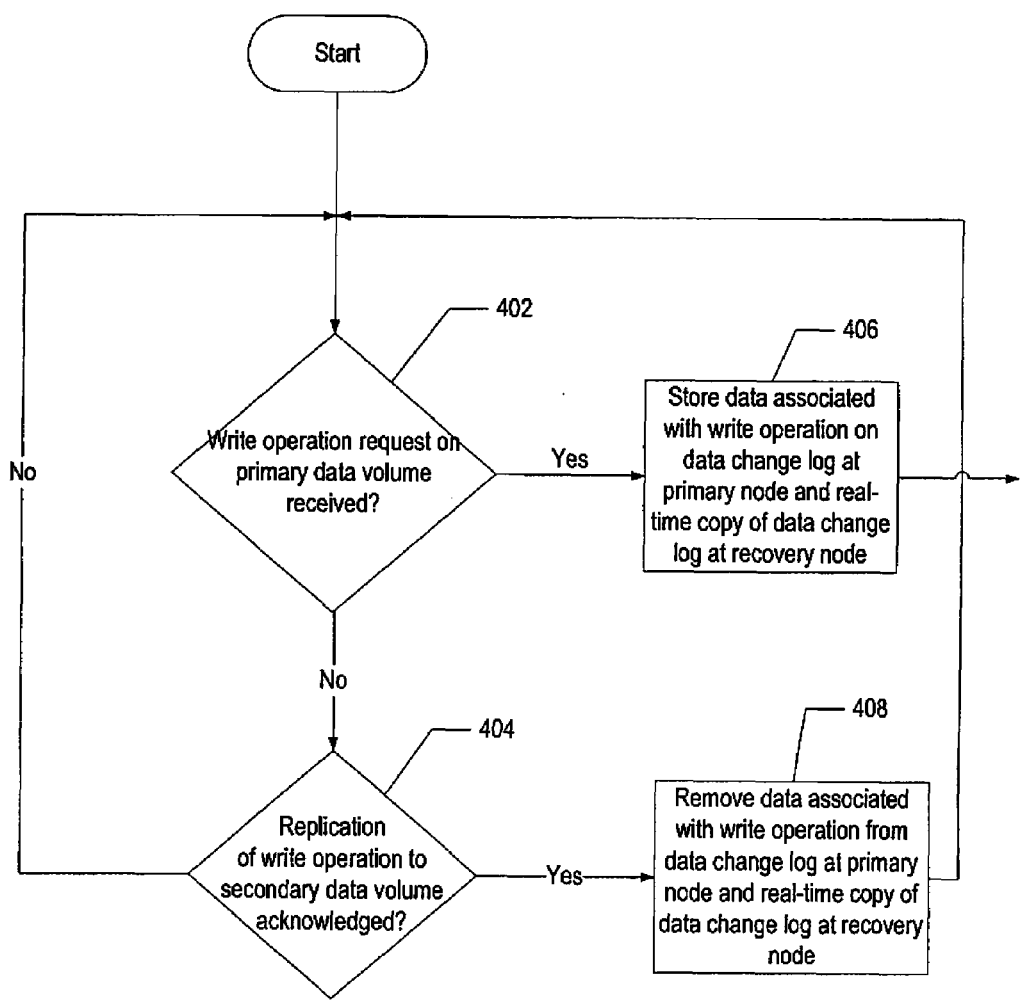
FIG. 4 illustrates a process flow diagram of a process in which a real-time copy of a data change log is maintained according to an embodiment of the present invention.

FIG. 4 illustrates a process flow diagram of a process in which a real-time copy of a data change log is maintained according to an embodiment of the present invention. According to one embodiment of the present invention, such a process may be performed using a volume replicator component and/or a volume manager component of a primary node including the data change log and an associated primary data volume as described herein. In the illustrated process embodiment, any modifications of the data change log are detected such that they may be duplicated in real-time on a copy of the data change log at a recovery node.

More specifically, determinations are made whether or not a write operation request on the primary data volume associated with the data change log has been received (process block 402) and whether or not the replication of a write operation on the primary data volume to a secondary data volume of a secondary node has been acknowledged (process block 404). Following a determination that a write operation request on the primary data volume has been received, data associated with the write operation is stored substantially simultaneously on the data change log at the primary node and the real-time copy of the data change log at the recovery node (process block 406). Similarly, following a determination that the replication of a write operation on the primary data volume to the secondary data volume has been acknowledged data associated with the acknowledged write operation is removed substantially simultaneously from the data change log at the primary node and the real-time copy of the data change log at the recovery node (process block 408).

Figure 5:
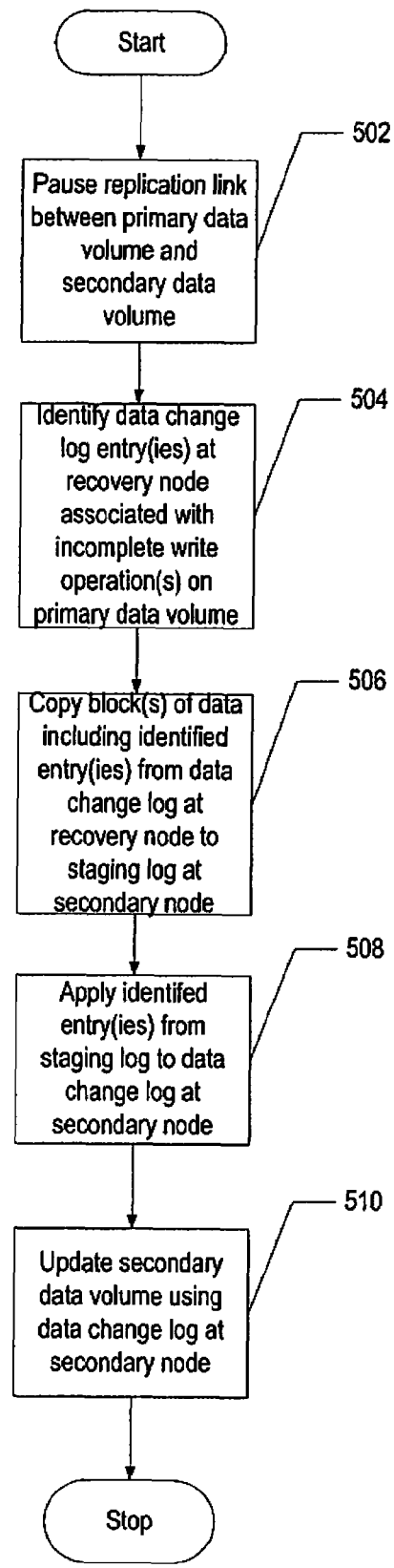
FIG. 5 illustrates a process flow diagram of a process in which a secondary data volume is updated using a real-time copy of a data change log according to an embodiment of the present invention.

FIG. 5 illustrates a process flow diagram of a process in which a secondary data volume is updated using a real-time copy of a data change log according to an embodiment of the present invention. In the illustrated process embodiment a replication link is initially paused between a primary data volume and secondary data volume (process block 502) to ensure that the secondary data volume remains consistent during data recovery and isn't corrupted by replication operations. Thereafter, one or more entries of the real-time data change log copy at a recovery node are identified as being associated with incomplete write operations on the primary data volume (process block 504). One or more blocks of data including the identified entry(ies) are then copied from the real-time data change log copy at the recovery node to a staging log at a secondary node which includes the secondary data volume (process block 506). The described staging log may be implemented in memory or, in an alternative embodiment, disk storage.

Once the block(s) of data including the identified entry(ies) have been copied to the staging log at the secondary node the identified entry(ies) are then applied from the staging log to a data change log at the secondary node (process block 508) which is in turn used to update the secondary data volume (process block 510). Using one or more of the described process embodiments of the present invention, data may be replicated over a long distance between a primary node and a secondary node of a data processing system using less expensive replication facilities (e.g., asynchronous replication) and less storage capacity at an intermediary recovery node as compared with traditional cascaded replication while providing the same consistency achievable using synchronous replication.

Figure 6:
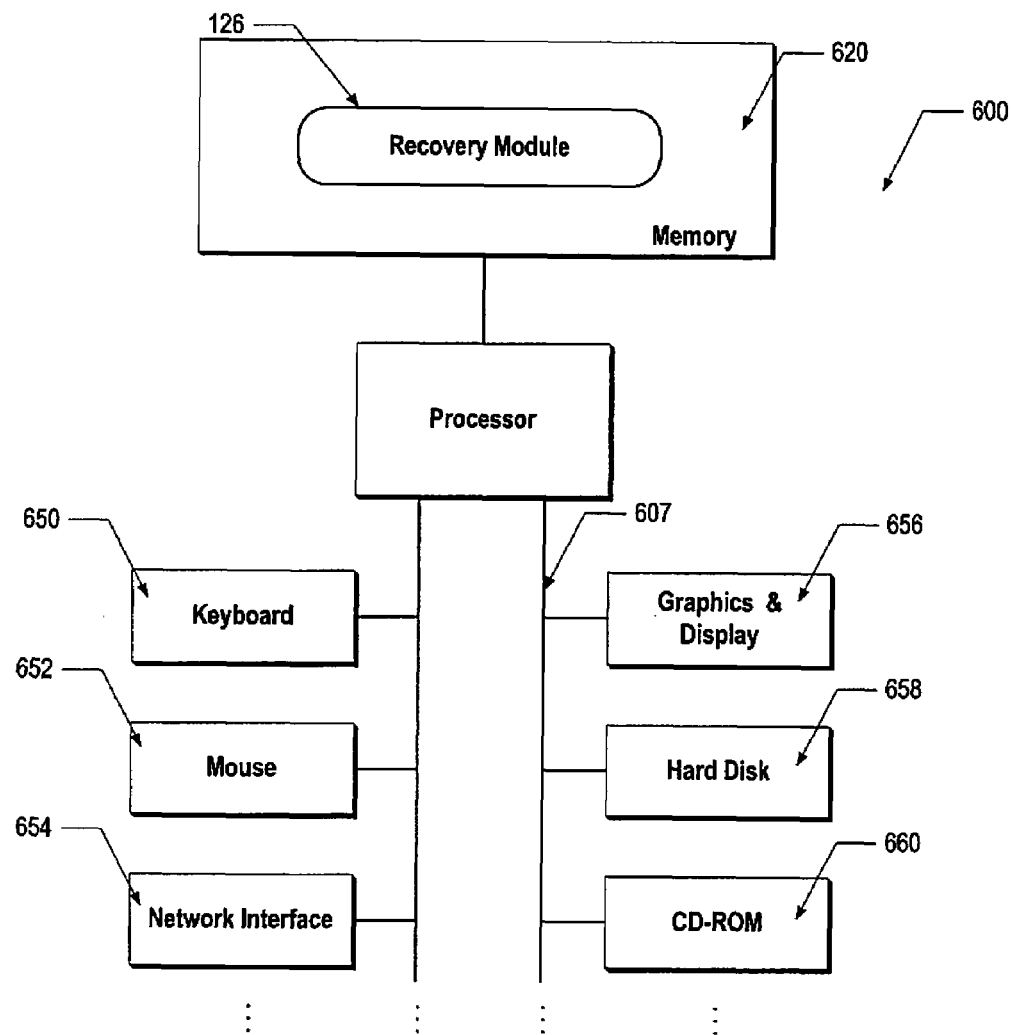
FIG. 6 illustrates a data processing system useable with one or more embodiments of the present invention.

FIG. 6 illustrates a data processing system useable with one or more embodiments of the present invention. Data processing system 600 can be used, for example, to implement one or more nodes of a larger data processing system. Data processing system 600 of the illustrated embodiment includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor(s), e.g., recovery module 126. Memory 620 is also used for storing temporary variables or other intermediate data during the execution of instructions by processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Shell, Perl and Tcl/Tk. Recovery module 126 can be provided to the data processing system via a variety of machine-readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Data processing system 600 of the illustrated also includes devices such as keyboard 650, and mouse 652, network interface 654, graphics & display 656, hard disk 658, and CD-ROM 660, all of which are coupled to processor 610 by communications bus 607. It will be apparent to those having ordinary skill in the art that data processing system 600 can also include numerous elements not shown in the figure, such as additional storage devices, communications devices, input devices, and output devices, as illustrated by the ellipsis shown. According to one alternative embodiment of the present invention, such an additional data processing system device comprises a fibre channel interface.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
maintaining a synchronous copy of a data change log at a primary node, wherein
said data change log at said primary node is associated with a primary data volume of said primary node; and
said synchronous copy of said data change log is maintained at a data recovery node and comprises a plurality of entries;
asynchronously updating a secondary data volume of a secondary node using said synchronous copy of said data change log, wherein said updating comprises:
identifying an entry of said plurality of entries as corresponding to an incomplete write operation on said primary data volume; and
updating said secondary data volume using said entry.

2. The method of claim 1, wherein said secondary data volume is updated in response to detecting a failure of the primary data volume.

3. The method of claim 1, wherein said maintaining said synchronous copy comprises:
receiving a request to perform a write operation on said primary data volume;
storing data associated with said write operation substantially simultaneously on said data change log and said synchronous copy of said data change log in response to said receiving.

4. The method of claim 2, wherein said updating comprises:
receiving a manual update initiation indication; and
updating said secondary data volume using said real-time copy of said data change log in response to said receiving.

5. The method of claim 1, wherein said updating comprises:
copying a block of data from said synchronous copy of said data change log to a staging log at said secondary node, said block of data comprising said plurality of entries;
applying each of said plurality of entries to a data change log at said secondary node in response to said copying; and
updating said secondary data volume using said data change log at said secondary node.

6. The method of claim 2, further comprising:
detecting a recovery of said primary data volume; and
resynchronizing said primary data volume and said secondary data volume in response to said detecting.

7. A machine-readable medium comprising a plurality of instructions, wherein said plurality of instructions when executed implement a method comprising:
maintaining a synchronous copy of a data change log at a primary node, wherein said data change log at said primary node is associated with a primary data volume of said primary node; and
said synchronous copy of said data change log is maintained at a data recovery node and comprises a plurality of entries;
asynchronously updating a secondary data volume of a secondary node using said synchronous copy of said data change log, wherein said updating comprises:
identifying an entry of said plurality of entries as corresponding to an incomplete write operation on said primary data volume; and
updating said secondary data volume using said entry.

8. The machine-readable medium of claim 7, wherein said secondary data volume is updated in response to detecting a failure of the primary data volume.

9. The machine-readable medium of claim 7, wherein said maintaining said synchronous copy comprises:
receiving a request to perform a write operation on said primary data volume;
storing data associated with said write operation substantially simultaneously on said data change log and said synchronous copy of said data change log in response to said receiving.

10. The machine-readable medium of claim 7, wherein said updating comprises:
copying a block of data from said synchronous copy of said data change log to a staging log at said secondary node, wherein said block of data comprises said plurality of entries;
applying each of said plurality of entries to a data change log at said secondary node in response to said copying; and
updating said secondary data volume using said data change log at said secondary node.

11. A data processing system comprising:
means for maintaining a synchronous copy of a data change log at a primary node, wherein
said data change log at said primary node is associated with a primary data volume of said primary node; and
said synchronous copy of said data change log is maintained at a data recovery node and comprises a plurality of entries;
means for asynchronously updating a secondary data volume of a secondary node using said synchronous copy of said data change log, wherein said updating comprises:
identifying an entry of said plurality of entries as corresponding to an incomplete write operation on said primary data volume; and
updating said secondary data volume using said entry.

12. The data processing system of claim 11, wherein secondary data volume is updated in response to detecting a failure of the primary data volume.

13. The data processing system of claim 11, wherein said means for maintaining said synchronous copy comprises:
means for storing data associated with a requested write operation on said primary data volume substantially simultaneously on said data change log and said real-time copy of said data change log.

14. The data processing system of claim 11, wherein said means for updating comprises:
means for copying a block of data from said synchronous copy of said data change log to a staging log at said secondary node, said block of data comprising said plurality of entries;
means for applying each of said plurality of entries from said staging log to a data change log at said secondary node; and
means for updating said secondary data volume using said data change log at said secondary node.

15. A data processing system comprising:
a storage element to store a synchronous copy of a data change log at a primary node, wherein said data change log at said primary node is associated with a primary data volume of said primary node and comprises a plurality of entries;

a recovery module configured to asynchronously update a secondary data volume of a secondary node using said synchronous copy of said data change log, wherein said recovery module comprises a failover management module configured to identify an entry of said plurality of entries as corresponding to an incomplete write operation on said primary data volume and update said secondary data volume using said entry.

16. The data processing system of claim 15, wherein said recovery module updates the secondary data volume in response to a failure of said primary data volume.

17. The data processing system of claim 15, further comprising:

a volume management module configured to mirror data to be written to said data change log to said synchronous copy of said data change log.

18. The data processing system of claim 15, wherein said recovery module comprises:

a failover management module configured to copy a block of data comprising
   said plurality of entries from said real-time copy of said data change log to a staging log at said secondary node.

* * * * *